E. R. Stilwell,
Steam-Boiler Condenser.
Nº 44,561.  Patented Oct. 4, 1864.
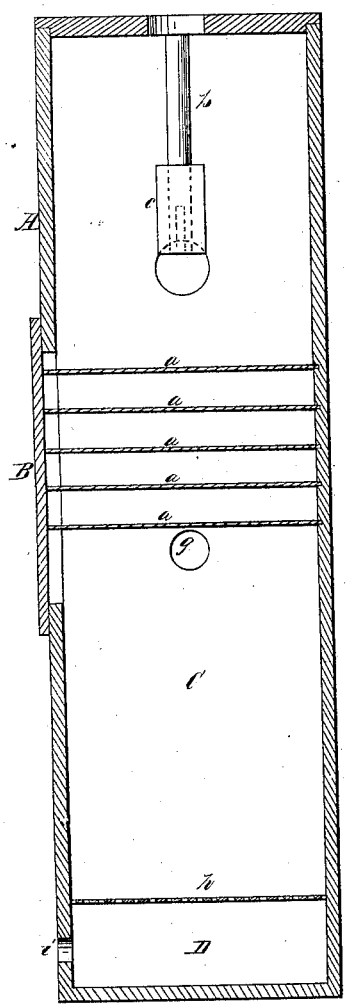
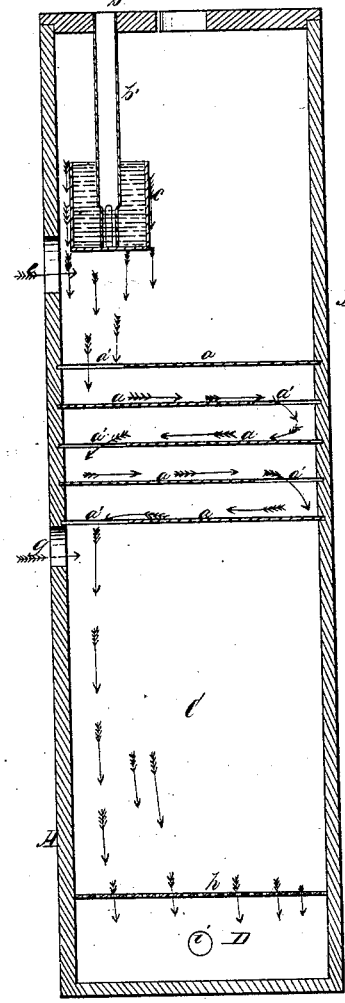
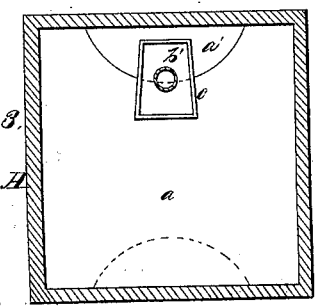
Witnesses:
R. T. Campbell
C. Schafer
Inventor:
E. R. Stilwell
by
Mason Fenwick & Lawrence
his Atty.

UNITED STATES PATENT OFFICE.

EDWIN R. STILWELL, OF DAYTON, OHIO.

IMPROVEMENT IN FEED-WATER HEATERS AND FILTERS.

Specification forming part of Letters Patent No. 44,561, dated October 4, 1864.

*To all whom it may concern:*

Be it known that I, EDWIN R. STILWELL, of Dayton, Montgomery county, State of Ohio, have invented a new and Improved Steam-Trap Filter; and I do hereby declare that the following is a full, clear, and exact description thereof, reference being had to the accompanying drawings, making a part of this specification, in which—

Figure 1 is a vertical section of my improved steam-trap filter. Fig. 2 is a vertical section taken in a plane at right angles to that of Fig. 1. Fig. 3 is a horizontal section taken in the plane indicated by red line $x\ x$, Fig. 1.

Similar letters of reference indicate corresponding parts in the three figures.

The object of this invention is to prevent, as far as possible, the incrustation of steam-boilers in consequence of the deposit of crystallizable salts contained in water by subjecting the feed-water, before it enters the boilers, to the action of steam introduced into a trap or filter in such manner that the water shall be deprived of its saline matters and the salt deposited in said trap, from which they can be readily removed at pleasure, as will be hereinafter described.

To enable others skilled in the art to make and use my invention, I will describe its construction and operation.

In the accompanying drawings, A represents a strong box, which may be made cylindrical or rectangular, as represented in the drawings. This box is provided with an opening in its side, which is closed by means of a tightly-fitting plate, B, and in a line with this opening are a series of shelves, $a\ a\ a$, which have openings $a'\ a'$ through them, arranged at alternate ends, as represented in Fig. 1. The object of the removable plate B is therefore to admit of the ready removal of the perforated shelves for cleaning, when they become very much incrusted with saline matter.

In the upper end of the box A an opening, $b$, is made, through which the feed-water pipe passes and enters the box A a short distance. This pipe $b'$ is secured at its lower end to an overflow-box, $c$, and the lower end of pipe $b'$ is perforated in a suitable manner to allow the water a free escape into the box $c$, as shown in Fig. 2. In a line with the lower end of the box $c$ an opening is made through one side of the box A at $e$, through which opening steam is admitted into box A in close proximity to the thin sheet of water falling from the overflow-box $c$, as indicated by the arrows in Fig. 2. From the box $c$ the water flows upon and over the entire surface of each one of the shelves $a\ a\ a$, and escapes from one shelf to another through the openings $a'$. After flowing over such a large surface the water again meets with an influx of steam admitted through the opening $g$, through the side of box A, and then flows through a filtering medium of a suitable description placed in the chamber C of the box A. After being filtered the water finally passes through the perforated plate $h$, and escapes from the chamber D through the outlet $i'$, and is conducted thence into a feed-water tank or directly into the steam-boiler.

It will be seen from the above description that in the first place the water is caused to flow into the box A in thin sheets, which are subjected to the action of highly-heated steam. This heats the water to such a degree as to cause a deposit upon the series of shelves, over which it afterward flows, of large quantities of the crystallizable salts. After being deprived of very much of its saline matters the water is again subjected to the influence of steam, which is introduced through an opening, $g$, when it is still further deprived of salt. The filtering of the water, after this process, deprives it of its solid matters which were held in suspension, and renders it very nearly pure—at least sufficiently pure for use in steam-boilers.

Instead of employing an overflow-box, $c$, as above described, a perforated nozzle or rose may be used to introduce the water into the box A in the form of spray, which may increase its capacity for taking up heat from the steam and depositing the salt.

Having thus described my invention, what I claim as new, and desire to secure by Letters Patent, is—

1. Purifying feed-water for steam-boilers by means of a steam-trap, which consists of a box, A C, provided with steam-orifices $e\ g$, overflow-box $c$, and perforated shelves $a\ a$, arranged substantially as described.

2. The combination of the overflow-box $c$, perforated shelves $a\ a$, and steam-inlets $e\ g$ with the chambers C and D, substantially as described.

E. R. STILWELL.

Witnesses:
CHS. H. CRAWFORD,
THOS. F. THRESHER.